United States Patent
Hale

[11] 3,734,241
[45] May 22, 1973

[54] DRIVE ON NO SLIP BLOCK

[76] Inventor: Chester A. Hale, Yucaipa, Ycaipa, Calif. 92399

[22] Filed: Aug. 30, 1971

[21] Appl. No.: 176,183

[52] U.S. Cl. .................................. 188/32, 188/4 R
[51] Int. Cl. ................................................ B60t 3/00
[58] Field of Search ........................... 188/32, 4 R; 105/368; 248/119

[56] References Cited

UNITED STATES PATENTS

| | | | |
|---|---|---|---|
| 1,746,415 | 2/1930 | Burkart | 188/32 |
| 2,065,528 | 12/1936 | Jolly | 188/32 |
| 2,475,111 | 7/1949 | Ridland | 188/32 |
| 2,719,610 | 10/1955 | Allison | 188/32 |
| 3,357,639 | 12/1967 | Peterson | 188/32 X |

Primary Examiner—Duane A. Reger

[57] ABSTRACT

A chock for an automobile wheel so to prevent the vehicle from rolling, the device consisting of an elongated plate the under side of which have teeth for firmly holding against the ground, the upper side of the plate having a concave channel upon which the wheel rolls, one end of the plate being connected by a hinge to a gang plank block, the opposite end of the plate having a stop block mounted there upon and against which the automobile wheel abuts after which the gang plank block is upwardly pivoted against the wheel and secured by a brace to prevent the wheel from rolling off again.

1 Claim, 6 Drawing Figures

Patented May 22, 1973 3,734,241
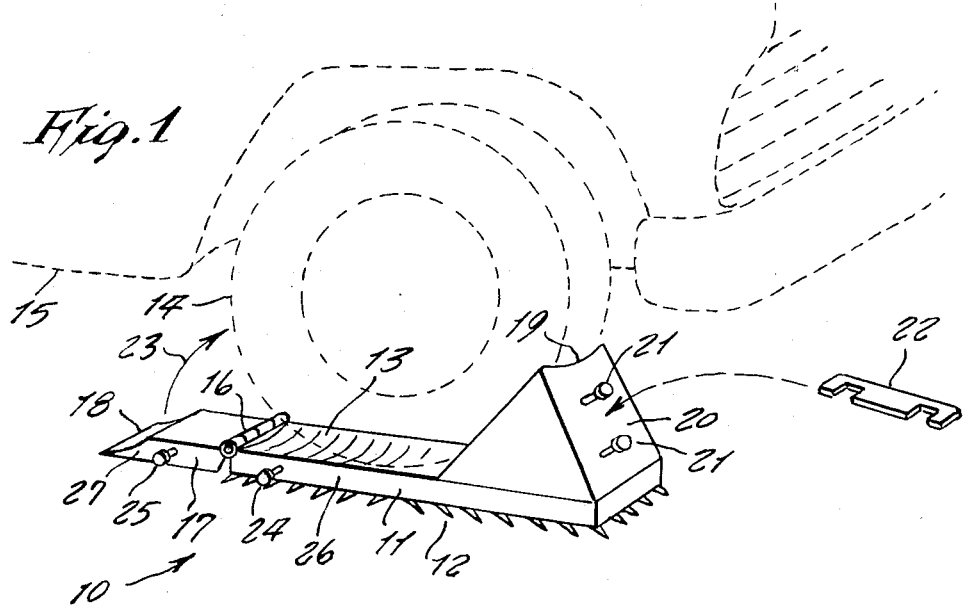
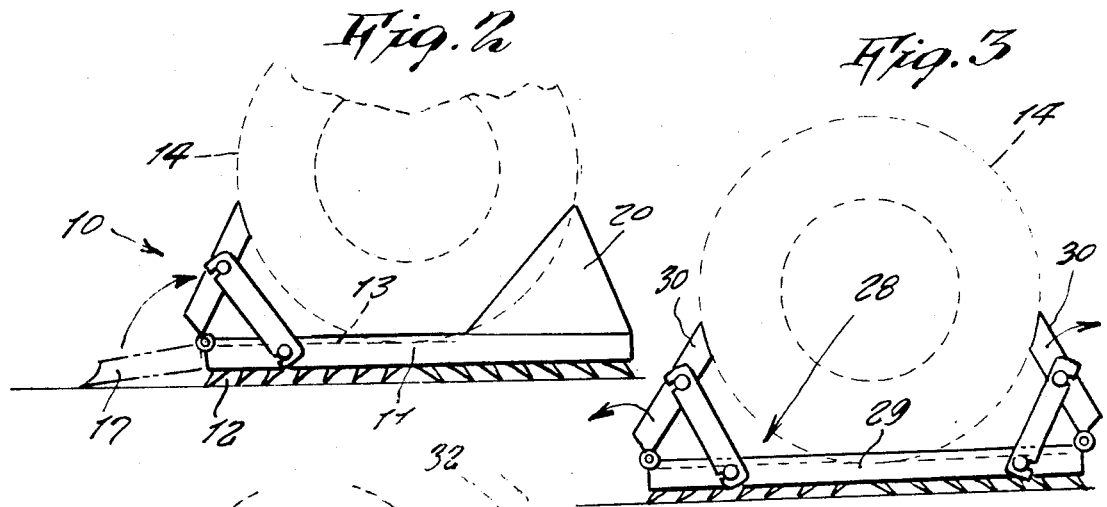
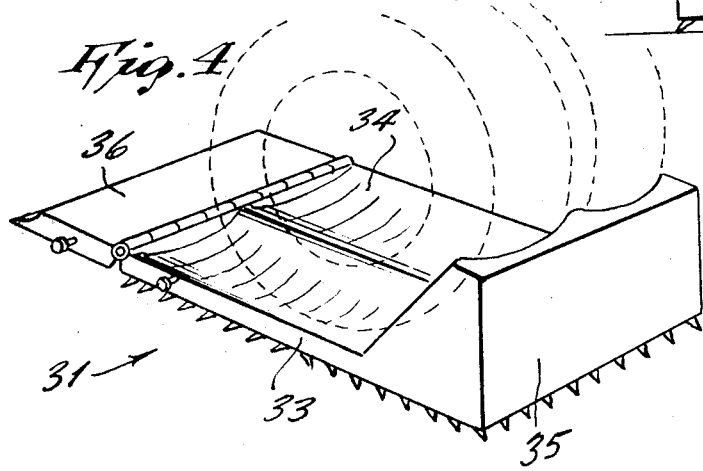
INVENTOR
CHESTER A. HALE

DRIVE ON NO SLIP BLOCK

A principal object of the present invention is to provide a heavy duty chock for an automotive vehicle which will securely hold the wheel and which will not slip.

Another object of the present invention is to provide a drive on hold shoe having a toothed under side so that it will frictionally hold firmly upon ice or on a steep incline.

Yet another object of the present invention is to provide a drive on no slip block which holds both front and rear edges of a wheel so that it cannot roll off either forwardly or rearwardly.

Yet another object of the present invention is to provide a drive on no slip block which can be designed either for a single wheel such as for a passenger automobile, or which can be designed for dual wheels of a heavy truck.

Yet a further object of the present invention is to provide a drive on no slip block wherein a gang plank plate serves for a wheel to ride upon the device and after which the gang plank plate is pivoted against the wheel to form a brace or rear chock so to prevent the wheel from rolling off again.

Other objects of the present invention are to provide a drive on no slip block which is simple in design, inexpensive to manufacture, rugged in construction, easy to use and efficient in operation.

These and other objects will be readily evident upon a study of the following specification and the accompanying drawing wherein:

FIG. 1 is a perspective view showing one form of the present invention in operative use for retaining an automobile wheel, FIG. 2 is a side elevation view thereof shown the wheel secured to prevent rolling either forwardly or rearwardly, FIG. 3 is a side elevation view of another modified design of the invention, FIG. 4 is a perspective view of a modified design of the invention adapted for dual wheel trucks, FIG. 5 is a side elevation view of a modified design of locking brace, and FIG. 6 is a side elevation view of still another design of adjustable locking brace.

Referring now to the drawing in detail, and more particularly at this time to FIGS. 1 and 2 thereof, the reference numeral 10 represents a drive on hold shoe or drive on no slip block according to the present invention wherein there is a horizontal, elongated main plate 11 which upon the under side thereof has a plurality of teeth 12 for firmly embedding or impressing against a ground, ice or other surface. It is to be noted that the teeth 12 at one end are inclined toward the same end while the teeth 12 at the opposite end of the plate are inclined toward there own respective end so that the plate will more securely prevent slipping either forwardly or rearwardly.

The upper side 13 of the plate 11 has an arcuate channel or groove and upon which the wheel 14 of an automobile 15 rides.

At one longitudinal end of the plate 11 there is a hinge 16 to which there is pivotally secured a gang plank plate 17. The end edge 18 of the gang plank plate 17 is diagonally arcuate so to eliminate a sharp bump when the wheel 14 rides up upon the block or plate. At the opposite end of the plate 11 there is secured a cast triangular block or chock 20, one side edge 19 of the chock block being arcuate so as to conform to the shape of a wheel tire which abuts there against so that the chock block forms a stop block.

Upon the stop block 20 there are a pair of extending pins 21 and upon which there is stored a removable brace 22.

In operative use, the automobile wheel 14 is driven upon the no slip block by first riding up the gang plank plate and then upon the arcuate grooved upper side 13 of the plate 11, the wheel coming into abutment with the chock or stop block 20. There after the gang plank plate is upwardly pivoted about the hinge 16 as indicated by the arrow 23. It is to be noted that a pin 24 is mounted upon a side edge 26 of the plate 11 and another pin 25 is mounted upon a side edge 27 of the gang plank plate, the pins 24 and 25 being adaptable to have the brace 22 slipped there upon so to hold the gang plank plate firmly against the rear edge of the wheel 14 and prevent the same from rolling off again, such as is clearly shown in FIG. 2. Thus there is provided a secure drive on no slip block.

Referring now to FIG. 3 of the drawing, there is shown a modified design of drive on no slip block 28 which is generally similar to the above described drive on no slip block 10 except that in this form of the invention, instead of a gang plank plate being located at one end and a stop block 20 being located at the opposite end, the plate 29 is provided with a gang plank plate 30 at each opposite end so that the wheel 14 can be moved upon the drive on no slip block from either direction, firmly held between the two gang plank plates, and afterwards the wheel being able to roll off the no slip block from either direction forwardly or rearwardly, depending upon which of the gang plank plates is let down. Thus a modified form of the invention has been provided.

Referring now to FIG. 4 of the drawing, there is shown still another modified design of drive on no slip block 31 which is generally similar in construction to the above described no slip block pin except that in this form of the invention, the no slip block 31 is constructed for holding dual wheels 32 of a truck. Accordingly in this form of the invention, the no slip block has a plate 33 having two parallel arcuate grooves 34 upon the upper side there of each one of which is adaptable for one of the wheels 32 to travel there upon. Also in this form of the invention, the stop block 35 is wide so that both wheels 32 can abut there against. Also the gang plank plate 36 is extra wide so that both wheels 32 may travel on and off there across. All other components are generally identical as above described.

In FIGS. 5 and 6 of the drawing there are shown modified braces 37 and 38 each one of which is provided with a plurality of notches 39 so that selectively the gang plank plates can be retained against the peripheral edge of different sizes of vehicle wheels.

What I now claim is:

1. In a drive on no slip block, the combination of a horizontal plate having a plurality of teeth on the underside thereof, the upper side of which is adaptable for a vehicle wheel to ride upon, a stop block being secured upon one end of said plate, the opposite end of said plate having a hinge to which a gang plank plate is pivotally secured, each end half of said underside having said teeth extending downwardly inclined toward its outward end edge, the upper side of said plate being arcuate concaved, and the side of said stop block abutting said wheel likewise arcuate concave, a removable brace fitted over a pin of said plate and a pin of said gang plank plate securing said gang plank plate upwardly inclined against a rear edge of said wheel, said brace having a plurality of notches along a side edge thereof for selectively engaging said pins, and said no slip block being designed for dual wheels of a truck.

* * * * *